Figure 1:
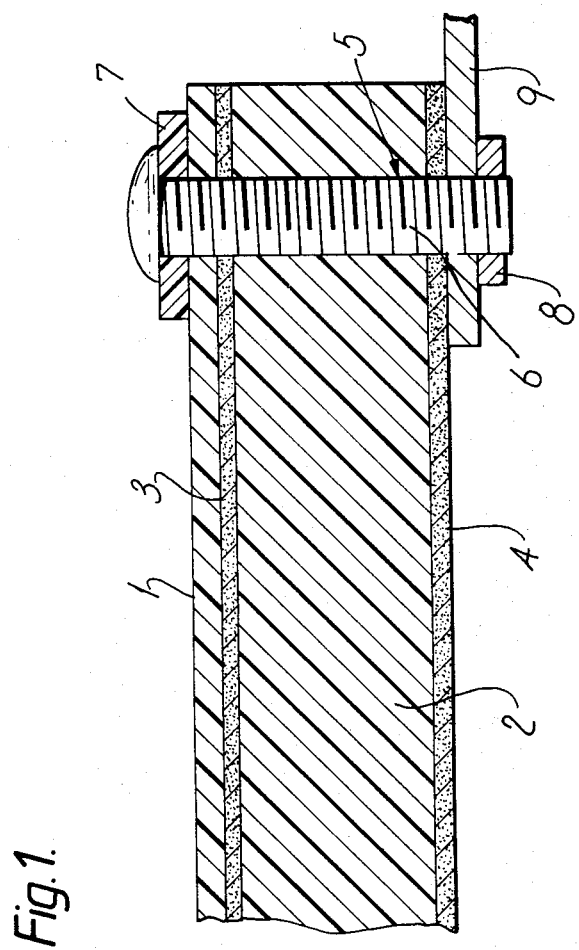

United States Patent [19]

Fellas

[11] Patent Number: 4,489,906
[45] Date of Patent: Dec. 25, 1984

[54] THERMAL CONTROL MATERIAL

[75] Inventor: Christakis N. Fellas, Stevenage, England

[73] Assignee: British Aerospace Public Limited Company, Weybridge, England

[21] Appl. No.: 525,810

[22] Filed: Aug. 24, 1983

Related U.S. Application Data

[63] Continuation of Ser. No. 204,703, Nov. 6, 1980, abandoned.

[30] Foreign Application Priority Data

Nov. 8, 1979 [GB] United Kingdom ............... 7938717
Jun. 2, 1980 [GB] United Kingdom ............... 8018037
Jul. 12, 1980 [GB] United Kingdom ............... 8022867
Sep. 4, 1980 [GB] United Kingdom ............... 8028615

[51] Int. Cl.³ .................................................. B64G 1/58
[52] U.S. Cl. .......................... 244/158 A; 244/117 A; 244/1 A; 427/38
[58] Field of Search ............... 244/158 A, 158 R, 121, 244/117 A, 1 A, 163; 361/218, 212; 427/38; 65/99.2, 66, 40, DIG. 4; 250/492.1, 492.2, 492.3

[56] References Cited

U.S. PATENT DOCUMENTS

| | | | |
|---|---|---|---|
| 2,897,365 | 7/1959 | Dewey et al. | 250/492.3 |
| 2,982,494 | 5/1961 | Amason | 244/1 A |
| 3,116,613 | 1/1964 | Evelyn | 244/117 A |
| 3,243,313 | 3/1966 | Aves, Jr. | 244/158 A |
| 3,316,620 | 5/1967 | Stewart | 307/400 |
| 3,374,830 | 3/1968 | O'Sullivan | 244/163 |
| 3,506,424 | 4/1970 | Pomerantz | 65/40 |
| 4,088,799 | 5/1978 | Kurtin | 427/38 |
| 4,114,369 | 9/1978 | Crowley | 244/158 R |
| 4,124,732 | 11/1978 | Leger | 244/121 |
| 4,237,514 | 12/1980 | Cline | 361/218 |

FOREIGN PATENT DOCUMENTS 7815036  5/1928  France ................. 244/1 A

OTHER PUBLICATIONS

Krusos, J. N. "Study of Ceramic Heat Shields for Lifting Reentry Vehicles", NASA Contractor (Bell Aerosystems Co.) Report NASACR-861.

Primary Examiner—Trygve M. Blix
Assistant Examiner—Rodney Corl
Attorney, Agent, or Firm—Cushman, Darby & Cushman

[57] ABSTRACT

Spacecraft are subject to electron bombardment resulting in electrical charge build-up on dielectric materials, such as thermal blankets, used to control heat gain and loss from the craft. The invention provides a multiple-layer material including inner and outer thermally insulating layers and an intermediate conductive layer, the outer insulating layer having a thickness such that many of the bombarding electrons will come to rest at or near the conductive layer and the resulting charge conducted away. Material may be in the form of a blanket with e.g. Kapton inner and outer layers or in the form of a glass tile. Material is also usable in other situations where electrical charge build-up may be a problem, e.g. for insulating explosive liquid containers.

9 Claims, 4 Drawing Figures

THERMAL CONTROL MATERIAL

This is a continuation of application Ser. No. 204,703, filed Nov. 6, 1980, now abandoned.

This invention relates to thermal control materials, more particularly but not exclusively to thermal control materials for insulating a spacecraft.

It is known to insulate a spacecraft, e.g. a satellite or a space probe, from the localised heating effects of the sun and from the loss of heat by radiation from the dark side of the craft, by covering it or portions of it with a flexible insulating blanket made of a dielectric plastics material such as Kapton or Teflon. It is also known to cover portions of the spacecraft with glass tiles. Such tiles may have a reflective backing, e.g. comprising silver or aluminium, to make the tile into a second surface mirror. Such tiles may be used as a heat loss element to control the temperature within the craft, the object of the reflective backing being to enhance the ability of the tile to reflect solar radiation when the tile happens to be in a position to receive such radiation.

In space, objects may be subject to bombardment by quite high energy electrons and due to this bombardment electrical charge builds up on and in any dielectric materials. On a spacecraft thermal blanket of the kind described, the charge may build up to a level where destructive discharges and arcs may occur. Apart from causing damage, such discharges may produce interference with the operation of electronic equipment on board the craft. In view of this problem, it has been proposed to apply a coating of electrically conductive paint to the outer surface of the blanket ("Electrostatic Charging and Space Materials", J. Bosma and F. Levadou, Page 189, Proceedings of Symposium on Spacecraft Material in Space Environment", E.S.T.E.C., October 1979, ESA SP-145). However, while degrading the thermal performance of the blanket, such a surface layer of conductive paint may in any case be relatively ineffective since, as has been found during research leading to the present invention, the bombarding electrons are of such energy that many of them penetrate right through the surface of the blanket and come to rest within its material. Charge thus builds up inside the material. Also, under certain circumstances, this charge may flow outwards and lead to the gradual flaking off of the paint layer.

According to one aspect of the present invention, there is provided a thermal control material comprising a multilayer sheet including an outer layer of thermal insulating material, a conductive layer next to said outer layer in which the electrical conductivity is substantially greater than in said outer layer, and a further thermal insulating layer next to said conductive layer and substantially thicker than said outer layer.

The thermal control material may be in the form of a flexible sheet, preferably using Kapton or Teflon, or alternatively the invention may be applied to the construction of the aforementioned tiles. Thus, the inner and outer layers could be of glass, preferably quartz or borosillicate glass.

The outer dielectric layer has a depth adapted to the use envisaged for the material. Thus, for insulating a spacecraft, the depth should be such that a sufficient number of the bombarding electrons come to rest in or near the conductive layer that the aforementioned charge build-up is reduced to a safe level. Between 3 and 8 microns has been found to be suitable.

It will be appreciated that, as well as for spacecraft, there are other situations where a thermal control material may be required but where the possibility of electrical charge build-up, not necessarily due to electron bombardment, is a problem. For example, the material may be useful in the construction of electronic equipment, particularly printed circuits and interference reducing screens, and for use in constructing containers for dangerous chemicals and explosives which may need to be given a measure of thermal insulation without the possibility of arcs and sparks occurring. As mentioned, for such other uses, the thickness of the outer layer will be chosen appropriately but, generally, it is envisaged that the outer layer thickness will not exceed 30 microns or so and probably will be less than 20 microns or even more likely less than 15 microns.

The conductive layer may be of high conductivity metal such as aluminium. This could be evaporated onto the inner surface of the outer layer of dielectric material and the inner layer of dielectric material could then be stuck to the metal layer by means of adhesive. Alternatively, the conductive layer could be a layer of conductive adhesive, e.g. adhesive loaded with conductive metal powder, which performs the additional task of securing the two dielectric layers together. Particularly for spacecraft, it may be advantageous for the conductive layer to be transparent, for example it may comprise a material such as indium-tin-oxide.

According to a second aspect of the invention, there is provided a spacecraft having affixed thereto a thermal insulating member comprising inner and outer layers of dielectric material and an intermediate electrically conductive layer which is electrically connected to the spacecraft body, the thickness of said outer layer of dielectric layer being such that a sufficient proportion of electrons, to bombardment by which the spacecraft may be subject in space, will come to rest at least near said conductive layer to reduce the build-up of electrical charge on said member to substantially less than would be the case were said conductive layer not present.

Figure 2:
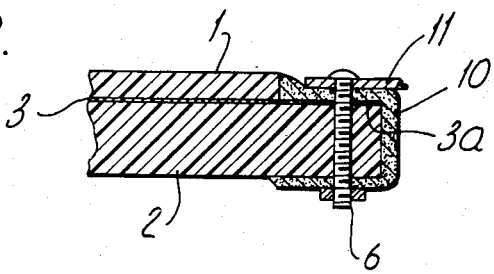
Figure 3:
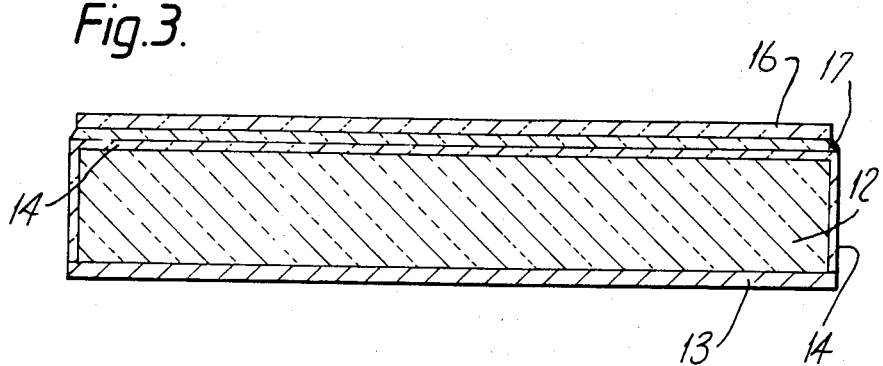
Figure 4:
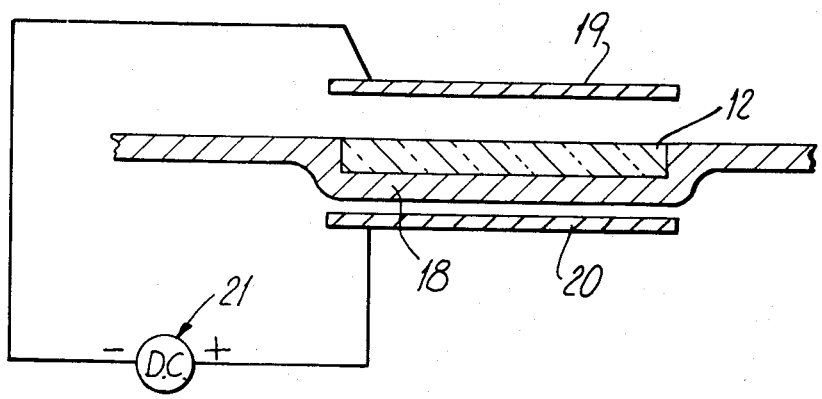

For a better understanding of the invention and to show how the same may be carried into effect, reference will now be made, by way of example, to the accompanying drawings in which:

FIGS. 1 and 2 are cross-sectional views of parts of respective thermal blankets for a spacecraft, FIG. 3 is a cross-sectional view of a glass tile for use in a spacecraft, and FIG. 4 is a diagram showing a method of enhancing the conductivity of glass.

The blanket shown in FIG. 1 comprises a thin outer layer of Kapton 1 and a thicker layer of Kapton 2 between which two layers there is a layer of electrically conductive material 3. "Kapton" is a registered trade mark and refers to a material sold under that name by the DuPont Company. The layer 3 could be formed by vacuum depositing a layer of conductive material onto the layer and then bonding the layer 2 to the layer 3 by way of a layer of adhesive material (not shown). It is believed better, however, to use for the layer 3 a conductive adhesive, e.g. an adhesive which has been loaded or filled with conductive material. This can be simply painted onto one of the layers 1 and 2 and the other of these two layers bonded to the first by means of the adhesive.

The electrically conductive material could be a metal such as aluminium or silver—this being in the form of dust if it is provided as the filling of a conductive adhesive. Preferably, however, the conductive material layer is made transparent for example by the use of indium-tin-oxide or a like transparent conductive material. Making the layer 3 transparent may increase the thermal emissivity of the thermal blanket which would be desirable for spacecraft. At the back or inner face of the layer 2 there is an optional further layer 4 of electrically conductive material of which the function is to prevent charge build-up due to any very high energy electrons which may be encountered and which penetrate the blanket to past the layer 3. The layer 4, like the layer 3, could be a thin vacuum deposited or painted-on metallic layer or it could be replaced by a relatively thick metal, e.g. aluminium, sheet (not shown) and be used also as an R.F. shield for the craft.

In order to connect the layers 3 and 4 to the spacecraft structure, the blanket has in it, along one or more edges for example, a series of holes 5 of which only one can be seen in the drawings. A bolt 6 is positioned in each hole with a Kapton reinforcing washer 7 beneath the head thereof and a nut 8 is tightened onto the bolt to make contact with one end of an aluminium earthing strap 9 of which the other end (not shown) is connected, e.g. by way of a further nut and bolt, to the spacecraft. Instead of a nut and bolt, each strap could be attached to the flexible blanket by some other means e.g. by soldering and the holes 5 filled up with conductive material, e.g. aluminium solder, to connect the layer 3 to the strap. As shown in FIG. 2, the outer Kapton layer 1 could end short of the edges of the blanket to leave exposed edge portions 3a of the conductive layer 3. Conductive paint 10 is applied over these exposed portions and around and under the blanket edges as shown and a strip of aluminium foil 1 is secured to the paint layer by bolts 12. The aluminium foil strip extends as an earthing strap (not shown) to the spacecraft body.

It is preferred that the overall thickness of the blanket is at least 0.002" in order to give it sufficient mechanical strength. Meanwhile, the thickness of the layer 1 can be optimised to give the most advantageous trade-off between the thermo-optical and electrostatic properties of the blanket. Such an optimum thickness can be determined for a particular application by experimentation. A thickness of $7.5\mu$ has been found to be appropriate. The thickness of layer 3 should be kept to a minimum to save weight but should remain sufficient to be able to conduct well the envisaged current. 1000 Angstroms appears to be useful although a thinner layer might be adequate for some applications. The layer 4 could also have a thickness of 1000 Angstroms.

Instead of Kapton, the layer 1 and/or the layer 2 could comprise some other plastics material such as P.T.F.E. (Teflon) or it could comprise another dielectric material such as glass.

In space the electrons incident on the thermal blanket have energies in the range of 2–20 Kev. Their range in a plastic material is given by the equation:

$$R \approx 1017.5 T^{1.42}$$

where R is the range in Angstroms and T is the kinetic energy in Kev. This gives the range of electrons for 20 Kev energy to be about $7.15\mu$.

In FIG. 3 there is shown a tile comprising a block 12 of borosillicate glass and backed by a layer of metallic silver 13 to make the tile into a second-surface mirror. The upper surface and the edges of the block 12 are coated with a layer 14 of transparent, electrically conductive material such as indium-tin-oxide. Finally, a relatively thin lamina of borosillicate glass 16 is attached to the top surface of the tile by means of transparent adhesive 17.

The borosillicate glass could be replaced by other kinds of glass, for example quartz. If the layer 14 is made of an electrically conductive adhesive material, then this could be used to attach the lamina 16 and the layer 17 may become unnecessary.

The tile shown in FIG. 3 may be attached, e.g. by means of adhesive, to an area which is to be thermally insulated on the outer surface of a spacecraft along with as many other like tiles as are needed to cover the area. Like the layer 3 in FIGS. 1 and 2, the function of the electrically conductive material layer 14 in FIG. 3 is to collect as many as possible of the penetrative electrons bombarding the spacecraft and to conduct them away so that charge does not build up to the point where disruptive discharges might occur. The thickness of the lamina 16 is thus again made such, having regard to the typical electron energy levels expected, that the majority of the bombarding electrons will come to rest in or close to the conductive layer. The conductive layer 14 extends down over the edges of the tile to the silver layer 13 and thence to the spacecraft, and provides an easy discharge path for charge associated with these electrons.

The tile of FIG. 3 could be made by taking a block of glass such as quartz or borosillicate glass for example, which is silvered on one side and forming an electrically conductive material layer a short way below the other side by the process known as ion bombardment. In this process, the block is irradiated by ions of an electrically conductive material having such energy that they penetrate and come to rest at the requisite distance below the surface of the block.

The process of ion bombardment can also be used to form the electrically conductive layer 3 in the blankets of FIGS. 1 and 2, i.e. by taking a single sheet of material such as Kapton and forming an electrically conductive layer by ion bombardment just below the surface of the sheet.

To further reduce undesirable build-up of electrical charge on and in each tile due to electron bombardment in space, the electrical conductivity of the glass, at least in the direction from the upper surface of the tile towards the spacecraft wall, may be enhanced for example by the method disclosed in our U.K. patent application No. 8018037, i.e. by preirradiating the tile with electrons in an electron accelerator and with sufficient electron energy to cause electrons to penetrate right through the tile. Alternatively, one or each of the glass layers 12 and 16 of the tile can be subjected to an electric field whilst molten, for example, when it is being moulded in a mould 10 as shown in FIG. 4. A strong D.C. field, preferably at around $4 \times 10^8$ volts/meter, is applied to the tile by means of two electrodes 19 and 20 and a voltage source 21. The molten material is allowed to set while the field is still applied. The action of the field is to polarise otherwise random molecular alignments within the molten material and thus enhance the conductivity of the material in the direction from the cathode 19 to the anode 20 in the figure. The cathode side of the moulded glass layer is thus made the surface furthest from the spacecraft whilst for the layer 12, the silver reflective layer is applied, after the layer has solidified, to the anode side. The mould 18 should be made of a material, Teflon, for example, having a low dielectric constant so that it does not affect the electric field too much. Alternatively, the mould base could be made of conductive material, metal for example, and be arranged to act as the anode itself—then the separate anode 20 is unnecessary.

The aforementioned method of conductivity enhancement by irradiation with electrons of sufficient energy to pass right through the material may also be used in relation to materials such as Kapton as disclosed in U.K. patent application No. 8018037. Thus, the thermal blankets of FIGS. 1 and 2 may be improved by using this method to enhance the electrical conductivity of each Kapton layer.

I claim:

1. A spacecraft to which there is attached a flexible multilayer thermal control blanket, the blanket comprising an inner layer made of flexible thermally insulative plastics material, a flexible intermediate electrically conductive layer which extends continuously over the outer side of the inner layer and which is electrically connected to the spacecraft body, and an exposed outer layer which is made of flexible thermally insulative plastics material and which has a thickness such that at least a substantial proportion of electrons bombarding the spacecraft while it is in space come to rest at least near said conductive layer whereby the electrical charge associated with these electrons is able to flow away through the conductive layer to the spacecraft body.

2. A spacecraft according to claim 1, wherein said thermally insulative plastics material is Kapton.

3. A spacecraft according to claim 1, wherein said thermally insulative plastics material layers have been artifically pre-bombarded with electrons of sufficient energy to penetrate right through the layers and to thereby enhance the electrical conductivity of the layers.

4. A spacecraft according to claim 1, wherein said blanket has been made by taking a single sheet of said thermally insulative plastics material and then forming said intermediate conductive layer within the sheet by bombarding the sheet with ions of electrically conductive material.

5. A spacecraft according to claim 1, wherein said intermediate conductive layer comprises high electrical conductivity metal.

6. A spacecraft according to claim 1, wherein said layers are transparent.

7. A spacecraft according to claim 1, wherein said blanket comprises, attached to the inner surfaces of said inner layer, a backing layer of metal.

8. A spacecraft according to claim 1, wherein said layers are secured together by adhesive.

9. A spacecraft according to claim 1, wherein said intermediate layer comprises conductive adhesive.

* * * * *